United States Patent [19]

Howlett

[11] Patent Number: 4,752,159

[45] Date of Patent: Jun. 21, 1988

[54] TAPERED THREAD FORMING APPARATUS AND METHOD

[75] Inventor: James W. Howlett, Berkeley, Calif.

[73] Assignee: Howlett Machine Works, Berkeley, Calif.

[21] Appl. No.: 837,950

[22] Filed: Mar. 10, 1986

[51] Int. Cl.[4] .......................... B23G 1/04; B23G 1/22
[52] U.S. Cl. ..................................... 408/14; 10/96 T;
408/107; 408/157; 408/170
[58] Field of Search ..... 408/14, 73, 74, 107, 148, 149,
408/157, 161, 169, 170, 147; 10/90, 96 T

[56] References Cited

U.S. PATENT DOCUMENTS

| | | | |
|---|---|---|---|
| 992,903 | 5/1911 | Richmond | 408/74 |
| 1,409,379 | 3/1922 | Hunziker | 408/157 |
| 1,650,778 | 11/1927 | White | 408/149 |
| 3,169,426 | 2/1965 | Renoux | 10/90 X |
| 3,415,552 | 12/1968 | Howlett | |
| 3,850,535 | 11/1974 | Howlett et al. | |

Primary Examiner—Z. R. Bilinsky
Attorney, Agent, or Firm—Flehr, Hohbach, Test, Albritton & Herbert

[57] ABSTRACT

A thread cutting apparatus and method are disclosed for the formation of tapered threads on the end of an elongated reinforcing bar of the type used in concrete structures. The apparatus includes a cutting head assembly having tool holder arms that are cantilevered outwardly from a face or barrier surface to effect cutting of the threads outwardly of the barrier so as to protect the guideways and cutting displacement structure control structure from chips and debris. The apparatus includes positive lead control for the thread cutting chasers, a rigid clamping structure for the bar and a fluid control assembly. The fluid control assembly is capable of positioning the cutting head and housing for one or a multiple number of frusto-conical cuts of predetermined depth to permit the simultaneous formation of threads and removal of material from the reinforcing bar end.

16 Claims, 7 Drawing Sheets

TAPERED THREAD FORMING APPARATUS AND METHOD

BACKGROUND OF THE INVENTION

The apparatus and method of the present invention relate, in general, to the field of the formation of threads on a cylindrical workpiece, and more particularly, they relate to the formation of a tapered thread on a concrete reinforcing bar.

There are many applications in which concrete reinforcing bars must be joined in end-to-end relation. These bars are usually formed with a pattern of ribs on their exterior so that when they are buried in the concrete they are effectively coupled to the concrete in a manner which will permit tension loads to be supported by the reinforcing bars.

For many years the coupling together of reinforcing bar ends was accomplished by welding or overlapping of sufficient lengths of the bars so that tension forces were effectively transmitted over the joint. Overlapped bars were usually wired together for casting purposes. The ribs on reinforcing bar ("rebar") made it difficult to mechanically couple rebar together in end-to-end relation. One approach to such mechanical coupling was to employ a coupling sleeve in which a pyrotechnically melted matrix of metal was used to lock the rebar ribs to the grooves inside the coupling sleeve. This system was commercially exploited under the trademark CADWELD. Another system for mechanical coupling employed a taper-threaded rebar coupler, namely, the coupler set forth in U.S. Pat. No. 3,415,552 and sold under the trademark FOX-HOWLETT NO-SLIP. This coupler required that the ends of the reinforcing bar be formed with a tapered thread so as to permit a coupling sleeve having mating taper-threaded ends to be used to form a high strength mechanical splice between the two reinforcing bars.

The mechanical coupler of U.S. Pat. No. 3,415,552 has now become the rebar coupler of choice in most projects, replacing prior welding, thermite and other bar joining techniques in the industry. One of the several advantages of such mechanical couplers is that four to five rotations of the coupling sleeve with respect to the rebar results in a complete threading together of the tapered threads over the entire length of the threads. For applications in which the reinforcing bar cannot be rotated, a taper-threaded union assembly also has been developed, as is set forth in U.S. Pat. No. 3,850,535.

While the taper-threaded reinforcing bar splice is a highly effective coupling system, the problems in connection with forming a tapered thread on the end of a ribbed concrete reinforcing bar are substantial, particularly as the size of the reinforcing bar increases. A No. 18 reinforcing bar, for example, weighs 14 pounds per foot, making manipulation of longer lengths of the bar a significant problem. Additionally, the ribs on the exterior of reinforcing bars pose machining problems that can be substantial.

Two approaches have been taken to the cutting of tapered threads on the ends of ribbed rebar. The first has been to modify a thread milling machine to enable formation of the tapered thread. Thread milling machines include a mechanism for slowly rotating the workpiece as the cutting tool is advanced.

Canadian Pat. No. 1,034,307 sets forth in detail a thread milling machine suitable for use in forming tapered threads on a rebar. Briefly, a milling head is set up at the proper angle, usually about 6 degrees, and then gradually advanced into the bar until the milling head has reached the proper depth in the end of the bar. The bar is then slowly rotated and simultaneously the milling head is advanced at an angle with respect to the bar's longitudinal axis so that a tapered thread having a lead is formed on the bar end. The primary disadvantage of this approach has been the size of the machine required and the need to rotate the heavy and unwieldy reinforcing bar, even though the rotation is slow and only through one revolution. Such taper-thread cutting apparatus do have the advantage of being able to form the tapered thread by a single pass or cutting process.

The other approach employed in the industry has been to form a rebar taper-thread cutting machine from a heavy-duty pipe threading machine. In such pipe threaders, the bar can remain stationary and thread chasers, held in the cutting head, are simultaneously rotated, displaced along the bar at an angle to form the tapered thread. The lead for the thread is produced by the chasers themselves, which tend to automatically feed axially along the bar. The thread chasers are used not only to form the thread, but also act to remove the necessary material from the end of the bar to produce the taper. Thus, the bar is not tapered by another tool and then threaded, but instead, the chasers are both removing material and threading. Since the amount of material to be removed is substantial on the larger bar sizes, two to four passes by the chasers are made in order to form the tapered thread at the desired depth or small-end diameter.

Several disadvantages have been encountered in connection with the use of heavy-duty pipe threaders for the formation of tapered threads on reinforcing bars. First, the bar itself is not rigidly clamped in the pipe threader, but is held in a self-aligning vise. This permits movement of the bar relative to the cutting head, with the result that ribs on the bar can influence the orientation of the frusto-conical thread. Additionally, since the apparatus has no positive lead control, the lead which is automatically cut by the thread chasers is sometimes imprecise. Both of these problems can often be accommodated by the taper-threaded coupling sleeve as long as they are within a range of tolerances.

Prior pipe threading machines also require that the end of the reinforcing bar be relatively clean and square to the longitudinal axis of the rebar. Reinforcing bars, however, are often cut to length by a shear, which can deform the bar end or leave a burr or uneven surface on the bar end. Thus, rebar fabrication shops often have to prepare the bar ends for threading in heavy-duty pipe threaders by sawing the bar end. This is a serious problem in terms of the need for a time consuming preparatory operation and the need for sawing equipment which is often not available in rebar fabrication shops.

Another serious problem in connection with heavy-duty pipe threading apparatus is that the cutting head and thread chasers surround the bar end so that the mechanism for radially displacing and advancing the thread chasers is exposed to chips cut from the bar. Since part of the process is to remove a significant amount of material from the bar end, chips not infrequently become lodged in the head guiding and control mechanism, which necessitates an undesirable amount of maintenance and repair. The thread cutting process normally is facilitated by the use of liquid coolant, which tends to carry the bulk of the chips out of the head, but the coolant also distributes chips to the surrounding guide surfaces of the cutting head so as to constantly expose the same to debris.

Another consideration in the formation of taper-threaded rebar coupling splices is the cost of bar threading. Using the modified thread milling machine, the cost of threading bar ends ranges from between about $2.75 to about $5.60 per end, including machine costs, cutter sharpening and replacement costs, and the labor cost. For a heavy-duty pipe threader, the costs are believed to be less for the smaller size bars, but they become more for No. 11 to No. 18 bars. The increase in cost is a result of the increase in the amount of material which must be removed and the attendant increase in labor and maintenance costs.

OBJECTS AND SUMMARY OF THE INVENTION

Accordingly, it is an object of the present invention to provide a thread cutting apparatus and method for forming a tapered thread on the end of an elongated, ribbed, concrete reinforcing bar in which the requirement for maintenance and repair of the apparatus is greatly reduced.

It is a further object of the present invention to provide a thread cutting apparatus for forming a tapered thread on a ribbed concrete reinforcing bar which is highly efficient in connection with threading reinforcing bars of widely ranging size.

Still another object of the present invention is to provide a thread cutting apparatus and method for cutting a tapered thread on a concrete reinforcing bar which effects a substantial savings in the cost of formation of the threaded ends.

Another object of the present invention is to provide taper-thread cutting apparatus for use with concrete reinforcing bars which can produce a more accurate and reproducible thread on the bar end.

A further object of the present invention is to provide a thread cutting apparatus and method which is suitable for use by relatively unskilled personnel, has increased durability and reliability, and eliminates the need for special preparation of the bar ends prior to threading.

The taper rebar threading apparatus and method of the present invention has other objects and features of advantage which will become apparent from the accompanying drawing and will be set forth in more detail in the following description of the preferred embodiment.

The thread cutting apparatus of the present invention includes bar clamping means formed to releasably and yet rigidly hold an elongated concrete reinforcing bar in a fixed position, a cutting head assembly mounted proximate to the clamping means for rotation about an axis substantially aligned with the bar axis, and a thread cutting tool mounted by a tool holder to the head assembly, the head assembly being mounted for relative advancement of the tool and cutting of the thread on the end of the bar at an angle to the longitudinal axis of the bar. The improvement in the thread cutting apparatus of the present invention comprises, briefly, a barrier associated with the head assembly which is substantially impervious to or impenetrable by metal chips and which faces toward the bar end, guide means for the tool holder positioned on a remote side of the barrier, and a tool holder mounted for rotation with the head assembly and cantilevered outwardly from the barrier and displaceable with respect to the barrier toward the bar end. The cutting tool is mounted to the tool holder, and the tool holder is mounted for displacement away from the barrier of the cutting head at an angle producing the tapered thread. The tool holder advancement and guide structures are all on a side of the barrier opposite the side on which the bar is positioned so that chips cut from the bar end are isolated from all of the guide and advancement structures by the barrier. The tool holder is formed for the free passage of metal chips generated during cutting away from the tool holder and barrier. Additionally, the apparatus preferably includes lead control assembly for controlled displacement of the tool holder away from the barrier to establish a positive and controlled cutting of the lead of the thread on the bar end.

The method of cutting a tapered thread on the end of a reinforcing bar of the present invention comprises the steps of securing the bar rigidly in bar clamping means, and cutting the thread with a thread cutting tool mounted on a tool holder carried by a rotating cutting head, with the improvement in the method of the present invention, comprised, briefly, of advancing the tool holder outwardly in cantilevered relation to and in a direction away from a barrier associated with the cutting head and positioned between the tool holder and the tool holder guide structure to isolate the guide structure from chips cut from the bar end.

DESCRIPTION OF THE DRAWING

FIG. 3 is a block diagram showing the relationship between FIGS. 3A and 3B.

DESCRIPTION OF THE PREFERRED EMBODIMENT

A. Cantilevered Tool Holders

Figures 1, 1A:
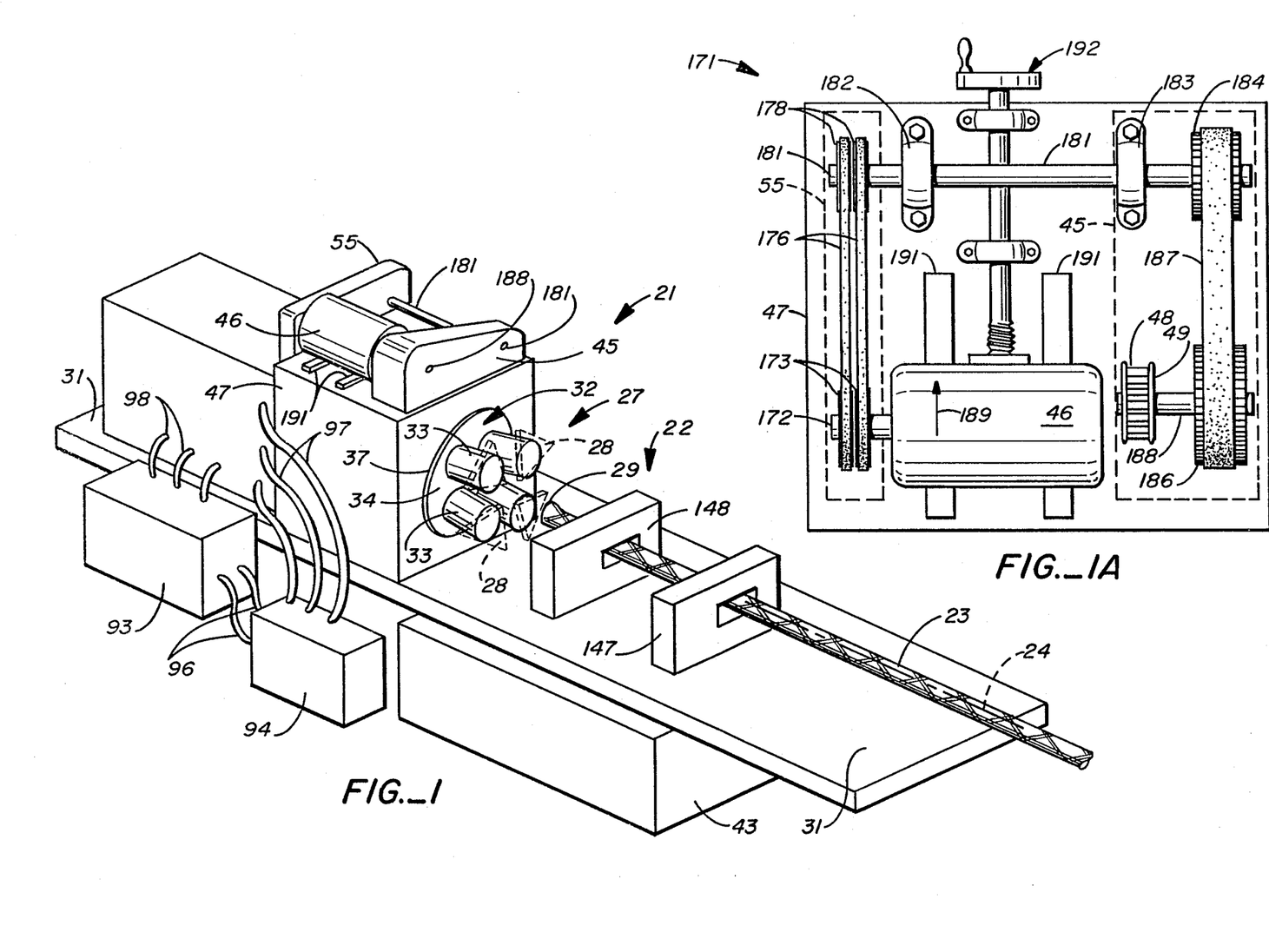
FIG. 1 is a top perspective view of a schematic representation of a thread cutting apparatus constructed in accordance with the present invention.
FIGURE 1A is a top plan schematic representation of a drive assembly suitable for use with the thread cutting apparatus of FIG. 1.
Figures 2, 2A:
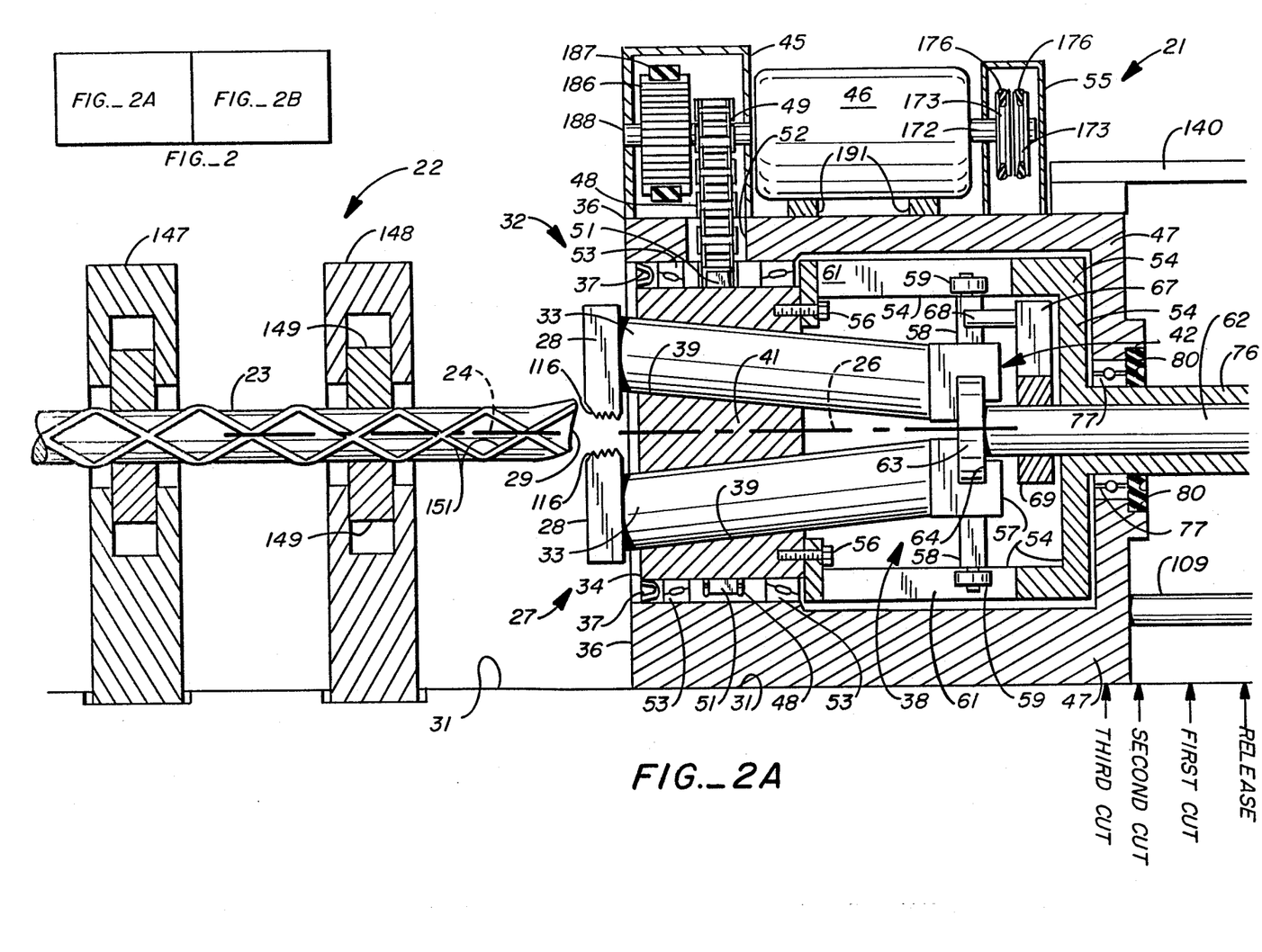
FIG. 2 is a block diagram showing the relationship between FIGS. 2A and 2B.
FIG. 2A is a side elevation view, in cross section, of the front portion of the thread cutting apparatus of FIG. 1.
Figure 4:
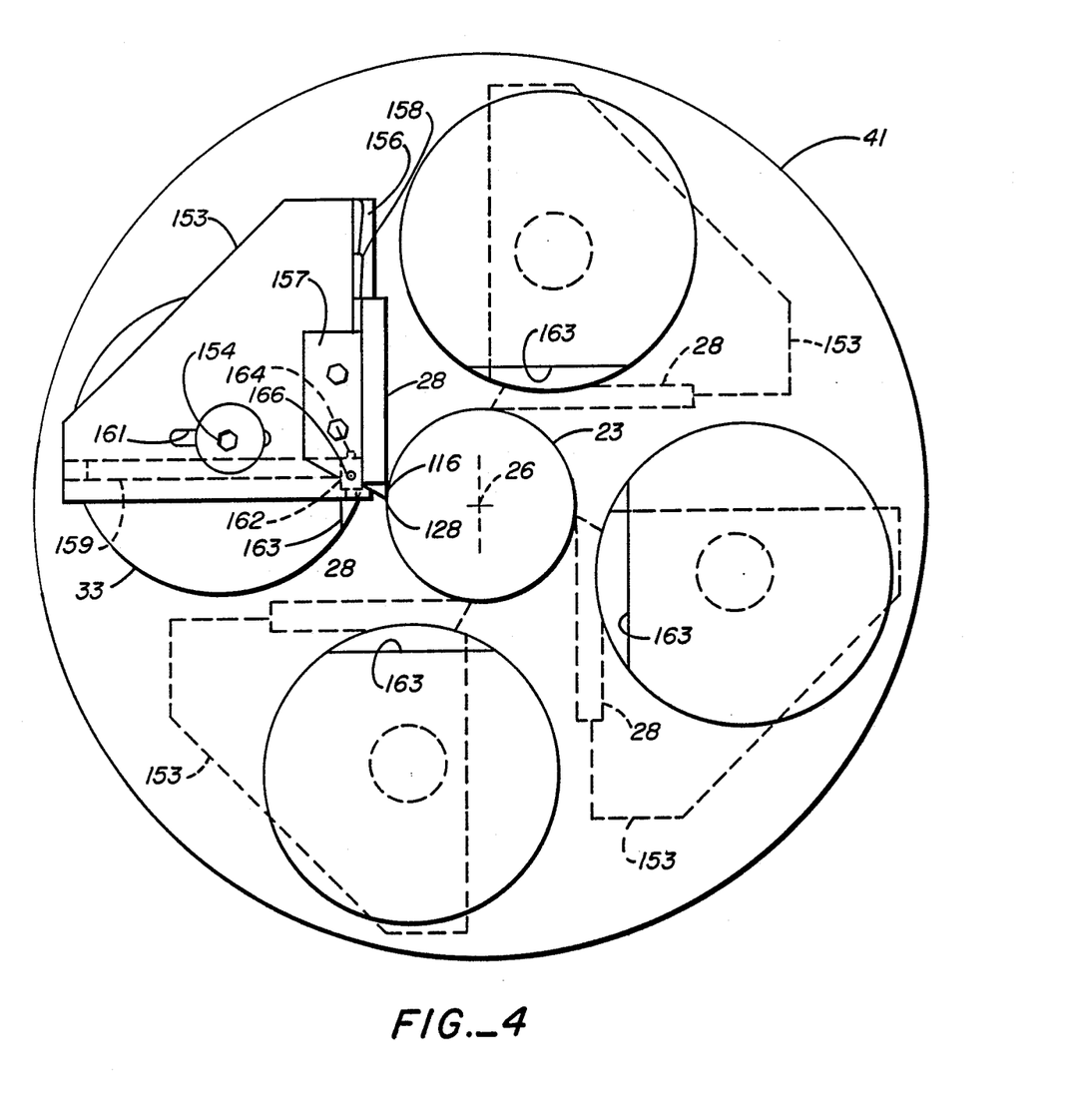
FIG. 4 is an enlarged, end elevation view of the tool holder assembly used in the apparatus of FIG. 1.

The major components of the reinforcing bar thread cutting apparatus of the present invention can best be understood by reference to FIGS. 1 and 2A. Thread cutting apparatus, generally designated 21, includes clamping means, generally designated 22, mounted to machine bed 31 and formed to releasably and rigidly hold elongated reinforcing bar 23 with the longitudinal axis 24 substantially aligned with the axis of rotation 26 of a cutting head assembly, generally designated 27. Carried by cutting head assembly 27 is thread cutting tool means 28, which is here shown as four thread chasers. It is preferable that thread chasers 28 be provided as tangential chasers of the type commonly available in industry from various manufacturers, such as Teledyne Landis Corporation. Cutting tools 28 are schematically represented in the drawing, and the details of the tool mounts may best be seen in FIG. 4 and will be described more fully below.

As is the case in prior art thread cutting apparatus, head assembly 27 is mounted for displacement to advance cutting tools 28 along bar 23 at an angle, such as 6 degrees, to longitudinal axis 24 of the bar so as to form a tapered thread on bar end 29.

As thus far described, the thread cutting apparatus of the present invention contains elements which are broadly known and employed in various thread cutting machines used in the industry.

In order to provide a thread cutting apparatus which requires less maintenance and will not become jammed or obstructed by the substantial volume of chips and debris generated during the thread cutting process, thread cutting apparatus 21 preferably includes a head assembly 27 which has barrier means, generally designated 32, from which tool holder means 33 is outwardly cantilevered toward bar end 29. Barrier means 32 includes a face portion 34 of rotatable head assembly 27, a side or face 36 of machine housing 47, and annular seal means 37 therebetween. Seal 37 is preferably a shaft seal mounted to prevent the entry of coolant and chips into housing 47, rather than to prevent the escape of lubricating oils from inside housing 47. Thus, shaft seal 37 is reversed with respect to the usual manner in which it would be mounted around rotating block or head 41 in order to further assist in providing a chip and coolant barrier.

As best may be seen in FIG. 2A, the tool holder guiding and advancement structure, generally designated 38, is on a side of barrier means 32 which is opposite to the side on which the cutting of the rebar takes place. Thus, guideways 39 in rotating drum or block 41 and tool holder advancement assembly 42 are shielded by barrier means 32 from the entry of chips and coolant into positions which would effect the guided displacement of the cutting tools.

Figure 3A:
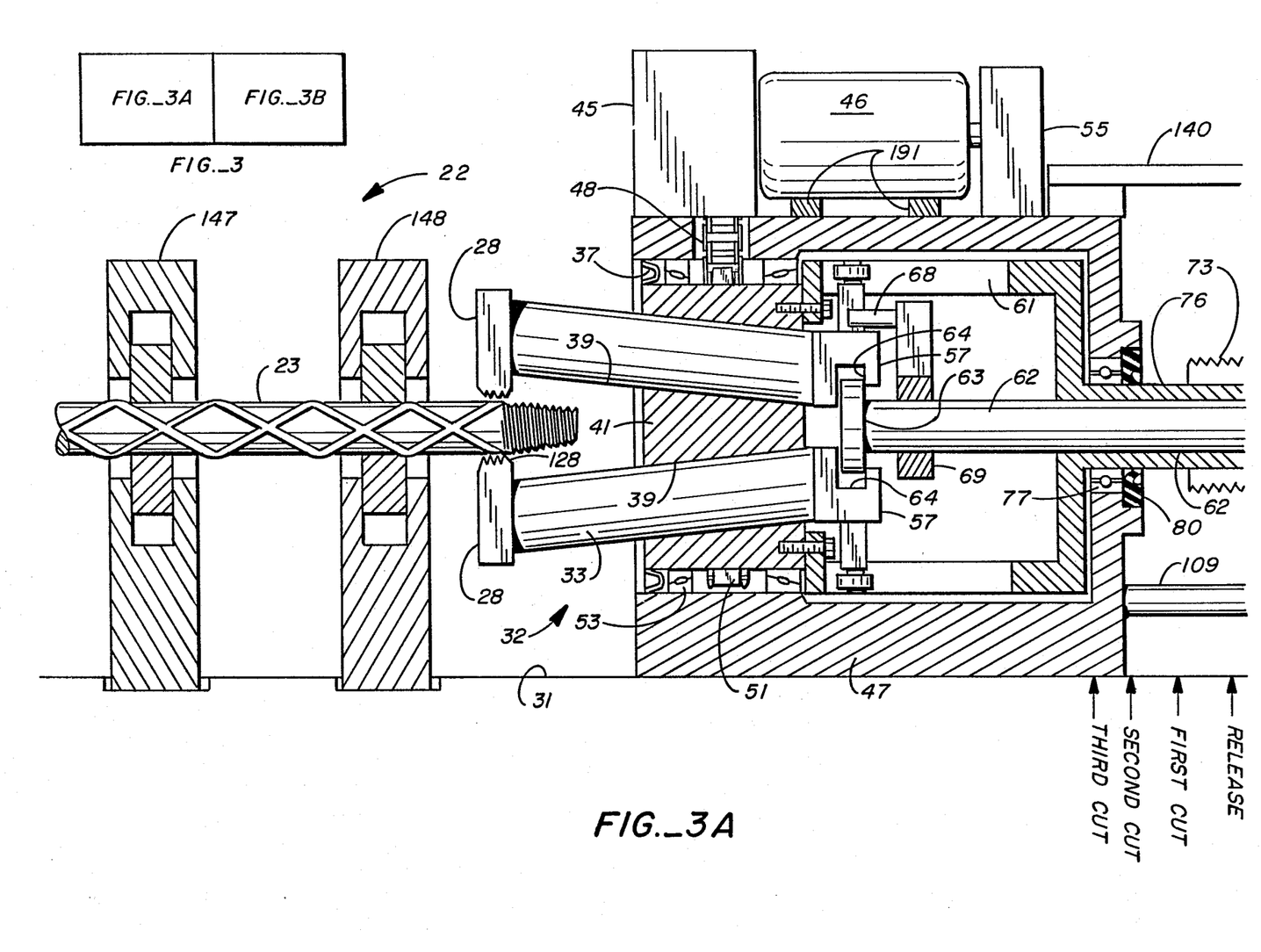
FIG. 3A is a side elevation view, in cross section, corresponding to FIG. 2A, and showing the thread cutting tools in a moved position.

Additionally, as will be seen in FIG. 3A, tool holder arms 33 (shown displaced outwardly from barrier means 32) are formed for the free passage of metal chips and coolant away from tools 28 and tool holders 33 and down to a coolant collecting tank 43 positioned under bed 31. Arms 33 are preferably cylindrical in cross section and mounted in cylindrical guideways 39 in the rotatable cutting head block 41. It has been found that guideways 39 can be bored in drum or block 41 with sufficiently close tolerances to the diameter of arms 33 that sealing means, such as O-rings, need not be employed to prevent the entry of debris between arms 33 and guideways 39. The cylindrical construction of holders 33, as well as rotation of head assembly 27, insures the minimum buildup of debris on the surfaces of the tool holder extending outwardly of the face of the machine housing and head assembly.

B. Drive Assembly

Rotation of head assembly 27 and outwardly cantilevered arms 33 is accomplished in the thread cutting machine of the present invention by providing a motor 46, such as an electrical motor, which is mounted to housing 47 and drives a series of sheaves, belts, sprockets and chains through a speed reduction assembly, generally designated 171 and best seen in FIGURE IA.

Mounted on motor output shaft 172 are pulley means, here a drive sheave with two grooves 173. A pair of V-belts 176 extend from sheave 173 to sheave 178 mounted to auxiliary shaft 181. Shaft 181 is rotatably mounted to housing 47 by bearing assemblies 182 and 183. Belt sprocket 184 is carried by the opposite end of auxiliary shaft 181 and drives belt sprocket 186 through ribbed drive belt 187. Coupled for rotation with belt sprocket 186 on shaft 188 is a drive sprocket 49 to which drive chain 48 is mounted. The exterior of rotatable head or block 41 has a sprocket 51 fixedly mounted thereto which meshes with drive chain 48 (see FIG. 2A). Chain 48 extends down through an opening 52 in housing 47 and loops around sprocket 51 and back to sprocket 49. The drum 41 is mounted for rotation, for example, on tapered roller bearing assemblies 53 which support the drum with respect to housing 47. Opening 52 in housing 47 and the speed reduction assembly is preferably covered by cover members 45 and 55.

The speed and torque can be varied in assembly 171 by displacing motor 46 in the direction of arrow 189 on motor guideways 191 by means of manual adjustment crank assembly 192. This causes belts 176 to go slack, permitting sheave 173 and/or sheave 178 to be changed.

As will be understood, therefore, motor 46 will rotate block or drum 41 about axis of rotation 26 through speed reduction assembly 171. Since arms 33 are carried by rotatable head block 41, they also are rotated about axis 26.

C. Tool Holder Cage Assembly

In order to insure that thread chasers 28 are oriented in a fixed relationship with respect to the rotating cutting head, it is further preferable to provide means for locking the cylindrical arms 33 against rotation with respect to drum 41. Thus, a cage-like structure 54 is secured, for example, by fasteners 56, for rotation with drum 41. The inner ends 57 of arms 33 are provided with laterally projecting arms 58 having roller elements 59 mounted to the distal ends thereof. Rollers 59 are in rolling engagement with slots or bearing surfaces 61 in cage 54, which slots extend in the direction of axis 26. Thus, roller elements 59 accommodate movement of arms 33 along axis 26, and yet prevent rotation of the arms with respect to drum 41.

D. Tool Holder Axial Displacement and Lead Control

Displacement of tool holder arms 33 outwardly of the face 34 of rotatable head assembly drum 41 is accomplished by axial displacement means 42. Displacement means 42 includes a push rod 62 having an enlarged end 63 mounted in sliding engagement with slots 64 (best seen in FIG. 3A) in the inner ends 57 of the tool holder arms. As push rod 62 is axially displaced, for example, from the position shown in FIG. 2A to the position shown in FIG. 3A, inner ends 57 diverge outwardly along the enlarged end 63 of push rod 62 as a result of the tapered guideways 39. This combined axial and lateral displacement causes thread chasers 28 to follow a tapering path for formation of a frusto-conical or tapered thread on the bar end 29.

It is an important feature of the present invention to provide positive control of the displacement of the thread chasers along axis 26. Such positive control insures a reproducible lead in the resulting thread on the bar end. Positive control of the cutting chaser advancement is accomplished in the apparatus of the present invention by a lead control assembly, generally designated 66, best seen in FIGURES 2B and 3B.

Rotation of cutting head assembly 27 is transmitted to push rod 62 by a torque arm 67 having a projection 68 which bears upon transverse arm 58 from inner end 57 of the tool holder arms. Keyed or otherwise fixed at collar 69 to push rod 62, torque arm 67 causes the push rod to rotate with drum 41. The outer end 71 of push rod 62 is mounted in bearing 72, which is secured to member 84 by washer 70, snap ring 60 and nut 65. An exteriorly threaded sleeve or spool member 73 is keyed at 74 for rotation with push rod 62. Threaded spool 73 is slidably mounted on a tubular member 76, which extends outwardly coaxially along push rod 62. As will be seen from FIGS. 2A and 3A, member 76 is secured to and is an extension of cage assembly 54 so that it rotates with the cage assembly and push rod. The tubular member 76 is mounted in bearings 77 and sealed by seal 80 to housing 47 to provide support for cage assembly 54 during rotation in the housing. As will be seen, therefore, push rod 62, tubular member 76 and threaded spool 73 all rotate together and are driven by motor 46 through the drum and cage assembly.

In order to enable displacement of tool holder arms 33, push rod 62 also is slidably mounted with respect to tubular member 76. The tool holder displacement assembly includes a pair of opposed thread engaging bronze shoes 78, which are shown in solid lines in engagement with spool 73 and shown in broken lines (FIG. 2B) displaced away therefrom. Clamping of shoes 78 against spool 73 is accomplished by opposed cylinders 79 which are held in a frame 81. Opening of the shoes can be provided by tension or return springs 75, and the shoe assembly is mounted to housing 82. As will be appreciated, a mechanical and/or electromechanical shoe assembly clamping structure also can be employed. Housing 82 is mounted for selective movement along bed 31 in a manner which will be described in more detail below, but housing 82 and the shoe assembly are held in a stationary position with respect to machine bed during advancement of the push rod and arms 33. Accordingly, frame 81 in which clamping cylinders 79 are held can be considered to be essentially stationary during displacement of the tool holder arms 33.

In order to effect displacement, therefore, the shoes are engaged with spool sleeve 73, which is rotating with the cutting head. As spool 73 rotates inside the stationary shoes, the lead on threaded spool 73 urges the spool toward housing 47 in the direction as indicated by arrow 83 in FIG. 2B. Comparing FIG. 2B and FIG. 3B, one will see that shoes 78 have remained essentially stationary with respect to bed 31, and spool 73 and bearing arm 84 have been advanced to the left, which in turn advances push rod 62 to the left or toward rotating drum 41. As spool 73 is advanced, it telescopes over inner tubular member 76. Additionally, bearing arm 84 which carries fluid cylinder 86 in the upper end 87 thereof is also advanced left toward shoe frame 81. Such advancement is accommodated by allowing piston 88 to telescope into cylinder 86, and end 89 of cylinder 86 to slide with respect to cylinder support member 91, which is rigidly mounted on the top of an extension 92 of housing 82.

E. Radial Positioning of Tool Holders

Radial displacement or positioning of the cutting tools at the start of each cut is preferably accomplished by displacement of housing 47 away from bar 23 while maintaining tool holders 33 in the same position relative to the rebar. Thus, housing 82 preferably includes a fluid control cylinder assembly, generally designated 120, in which there are four cylinders fixedly mounted to housing 82. Each of these cylinders has a piston which can be outwardly displaced against collar 111. As the pistons extend outwardly, they will displace collar 111 to the right. Secured to collar 111 is a connecting rod 109, which movably passes through housing 82 and is secured at its opposite end to housing 47. Displacement of collar 111 by cylinder assembly 120 in the direction indicated by arrow 124, therefore, produces displacement of the connecting rod without any movement of housing 82 or shoe frame 81 and push rod 62. Thus, housing 47 moves to the right and the taper in guideways 39 causes the thread chasers to separate and cantilever outwardly of face 34. The tools, however, are not advanced toward the bar. Displacement of collar 111 and thus housing 47 is terminated by adjustable stop assembly 115, which is mounted to downwardly depending leg 104 and extends through openings in collar 111 so as to engage and stop further advancement of the respective pistons.

F. Fluid Controls

Figure 2B:
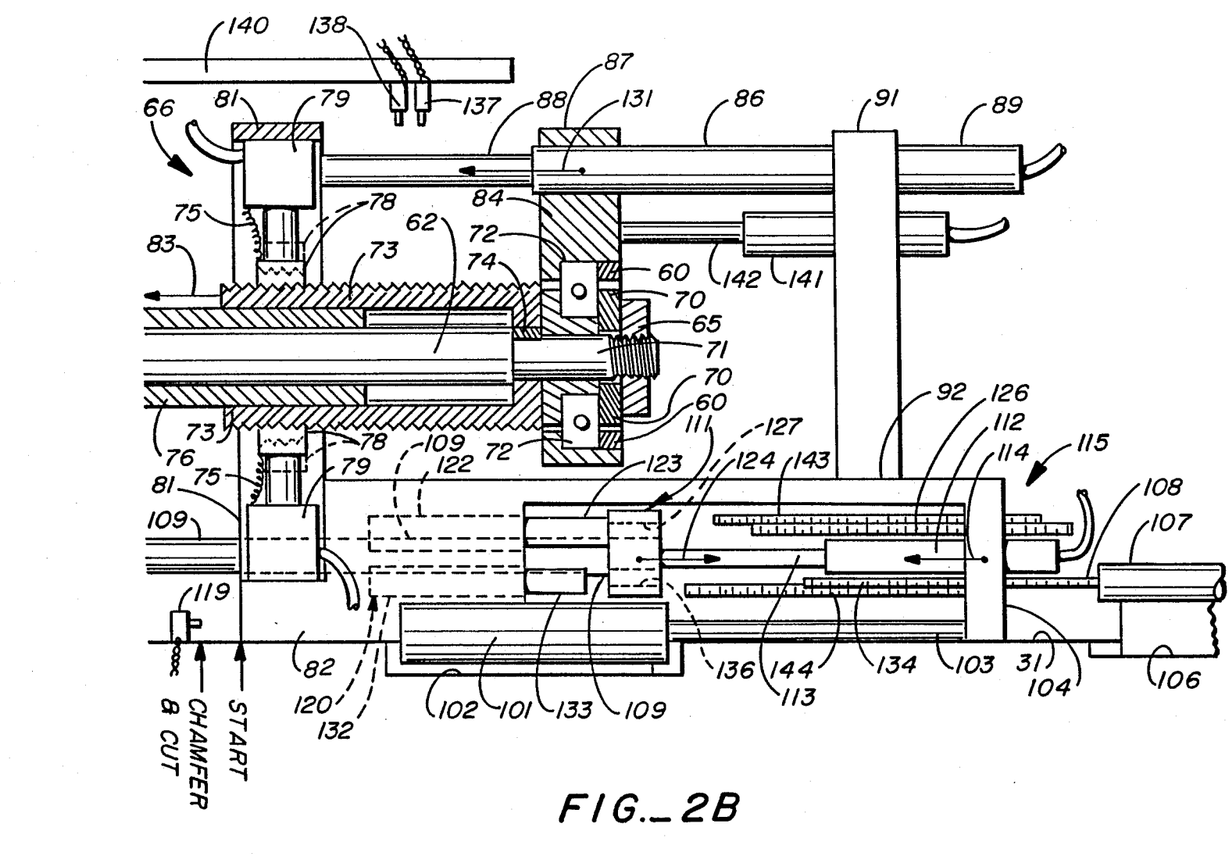
FIG. 2B is a side elevation view, in cross section, of the rear portion of the thread cutting apparatus of FIG. 1.
Figure 3B:
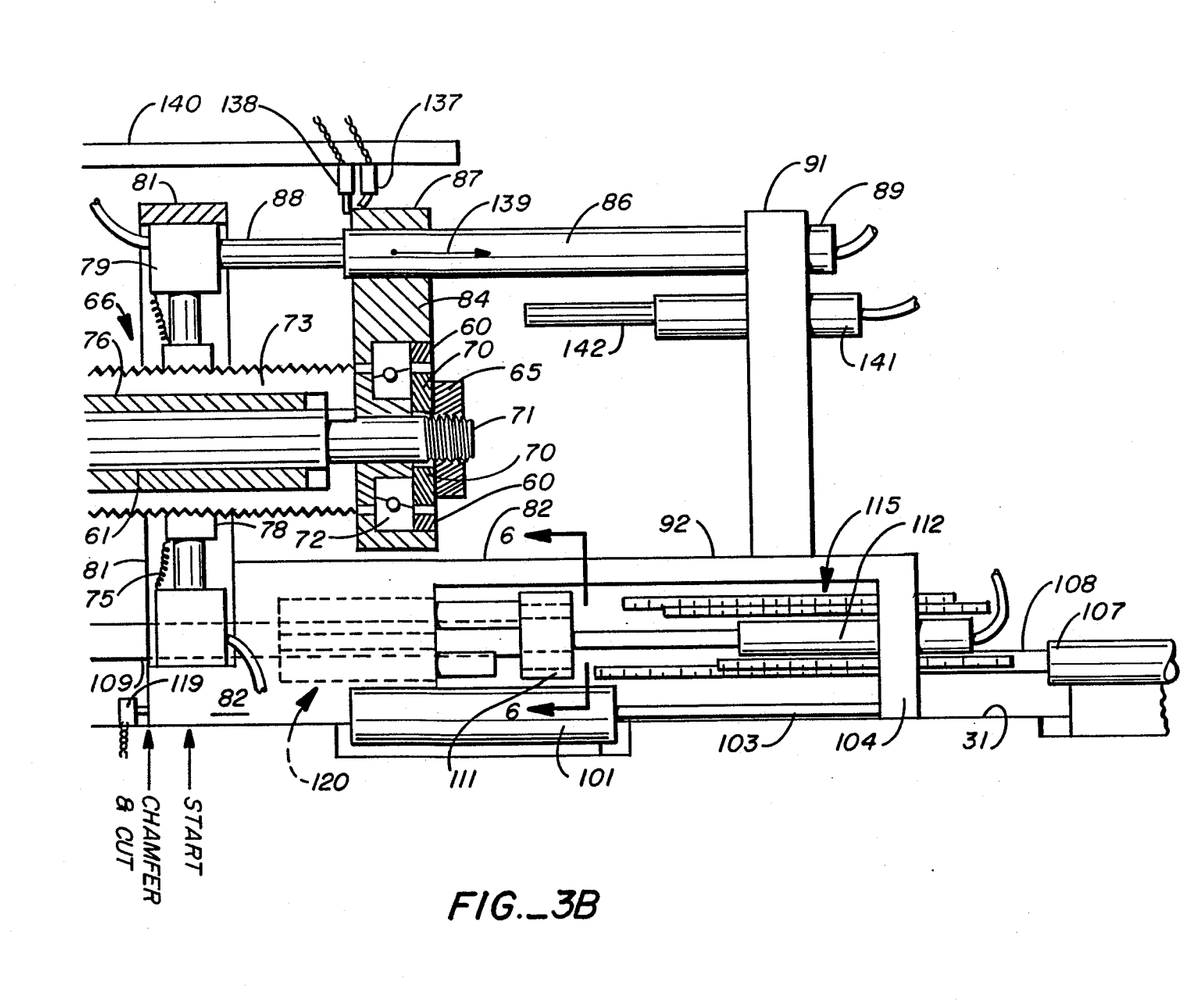
FIG. 3B is a side elevation view, in cross section, corresponding to FIG. 2B, and showing the control assembly in a moved position.

Control of the displacement of tool holders can be mechanical, electrical or fluid-based. As shown in the drawings, it is preferred to employ a hydraulic fluid control means. Thus, hydraulic pump 93 (FIG. 1) is in fluid communication with hydraulic logic valve assembly 94 through fluid conduits, schematically represented at 96. The fluid logic circuits 94 are coupled in turn through conduits 97, schematically shown, to various of the control piston-cylinder assemblies, such assemblies 79, 89, 101, 112 and 141 which are described in more detail in connection with operation of the apparatus as shown in FIGS. 2B and 3B. Lines 98 schematically represent return conduits for flow of hydraulic fluid back to the sump for recirculation by pump 93.

G. Operation-Chamfering

It is an important feature of the apparatus of the present invention to provide a chamfering capability. As will be seen in FIGS. 2A and 5, it is not uncommon for bar end 29 to be skewed or unevenly cut. Reinforcing bars are typically sheared to length, which produces an end cut that is often not square or perpendicular to axis 24 of the bar. Similarly, the shearing process will sometimes distort the edges of the bar (this distortion is somewhat exaggerated in the drawing for purposes of illustration).

In prior art apparatus it is sometimes necessary to saw cut the bar end before it is threaded with a tapered thread. This requires a separate saw, which is often not available or convenient to use in rebar fabrication shops. The apparatus of the present invention overcomes the problem of uneven bar ends by forming a chamfer 117 (shown in phantom in FIG. 5) as a first step in the bar threading process. Chamfer 117 removes the burrs and uneven surfaces on the bar end so that when the thread chasers are advanced into the bar end, they do not encounter rough or jagged sheared surfaces. The chamfering operation insures that the chasers will not be unduly stressed upon entry into the rebar. This is important because it is highly desirable to take cuts of substantial depth so as to minimize the number of passes required to reach the nominal taper-threaded minimum diameter.

As will be appreciated, however, bar ends 29 sometimes will be cleanly and evenly cut, making chamfering of the ends optional. Similarly, as the size of the bar decreases, the depth of the cut with the chaser portion of the tools can be decreased, making it less likely that the chasers will be over-stressed when entering the bar. In some applications, therefore, chamfering need not be employed, and fluid controller logic valves 94 preferably include the capability of selecting or omitting the chamfering step.

The chamfering operation may be accomplished by fully retracting tool arms 33 until tools 28 are proximate drum face 34. This positions tools 28 at the minimum radial distance from axis of rotation 24. As best may be seen in FIG. 5, thread chasers 28 are provided with a cutting edge 116 which slopes inwardly such that it will cut a frusto-conical chamfer 117 on bar end 29 if brought into cutting engagement with the bar end.

Chamfering by Alternative Method No. 1 (See bottom chaser in FIG. 5) is accomplished by moving housing 47 and tool holders 33 toward bar end 29 as a unit. In order to displace housing 47 and tool holders 33 as a unit, it is necessary to displace housing 82 and collar 111 together (instead of displacing collar 111 relative to housing 82).

Displacement of housing 82 on which the lead engaging shoes 78 are carried, is controlled by two fluid piston-cylinder assemblies. Cylinder 101 is fixedly mounted to bed 31 of the machine frame, which is schematically shown in FIGS. 2B and 3B by the recess 102 so as to distinguish those elements which are fixedly mounted to bed 31 from the elements slidably mounted to bed 31. Housing 82 and housing 47, for example, are slidably mounted to bed 31 on ways, not shown, on the bed. Extending rearwardly from cylinder 101 is a piston 103 which engages downwardly depending leg 104 that also slidably rides on bed 31 and moves, by reason of extension portion 92, with housing 82. Also fixedly mounted to bed 31, as indicated by recess 106, is cylinder 107, which has a piston 108 extending outwardly therefrom and engaging the downwardly depending leg 104 in a direction opposed to piston 103. The purpose of cylinders 101 and 107, therefore, is to control displacement of housing 82 between two positions, namely, the position shown in phantom FIG. 2B and labelled a "START" and the position shown in FIG. 3B and labelled "CHAMFER AND CUT."

Movement of housing 82 is transmitted to housing 47 through connecting rod 109, which extends through housing 82 and is coupled to collar 111. Fluid cylinder 112 is mounted to leg 104 of housing structure 82 and has a piston 113 which extends into engagement with collar 111. As long as cylinder 112 maintains collar 111 at a fixed distance from leg 104, displacement of leg 104 by the cylinders 101 and 107 will produce a corresponding displacement of housing 47. Since the thread engaging shoes 78 are carried on housing 82 by frame 21, spool 73 and push rod 62 are also moved with housing 82.

In practice, it is preferable that cylinder 107 always be pressurized and cylinder 101 be intermittently pressurized. Cylinder 101 is formed to have sufficient area so as to be capable of overcoming cylinder 107 to displace leg 104, housing 82 and housing 47 to the right and back to the "START" position.

In addition to moving housing 82 to the "START" position, tool holders 33 must be retracted inside drum 41 before the chamfering step is started. Cylinder 86 is used to retract movable bearing arm 84 to the position shown in FIG. 2B by extending piston 88 against upstanding frame 81, which is carried by housing 82. This moves push rod 62 to the right and retracts the tool holders. During this retraction process, of course, springs 75 have retracted shoes 78 so that spool 73 is free to slide on sleeve 76 to the position of FIG. 2B.

When the tool holders are retracted the tools positioned proximate axis 24, and housings 47 and 82 are moved to the "SECOND CUT" and "START" positions respectively, chamfering is started by relieving the pressure in cylinder 101. This results in cylinder 107 driving leg 104 to the left, as indicated by arrow 114 (FIG. 2B). As leg 104 is driven to the left, it in turn drives collar 111 to the left through cylinder 112 and piston 113. The entire cutting assembly housing 47 also is displaced to the left through connecting rod 109. Since the tool holders 33 have been retracted to the maximum right hand position by cylinder 86, chamfering surfaces 116 on thread chasers 28 are in a position to be brought into contact with bar end 29, as best may be seen in phantom in FIG. 5. Movement of housing 47 and tool holders 33 as a unit prevents radial displacement of the tools. Accordingly, axial displacement of the radially inwardly positioned thread chasers, shown in phantom, (as indicated by arrow 118 in FIG. 5) forms a chamfer 117 on the bar end.

Chamfering bar end 29 can be accomplished with the apparatus of the present invention by at least two processes. First, as previously described by Alternative Method No. 1, if tools 28 are initially positioned close to axis 24 and to bar end 29, piston-cylinder assembly 101–103 and 107–108 drive the tools on a straight path toward bar end 29. The chamfering surface 116 would engage the bar end and form a chamfer before the thread cutting teeth reach the bar end. After formation of the chamfer the tools would be radially separated for the first cut.

Figure 5:
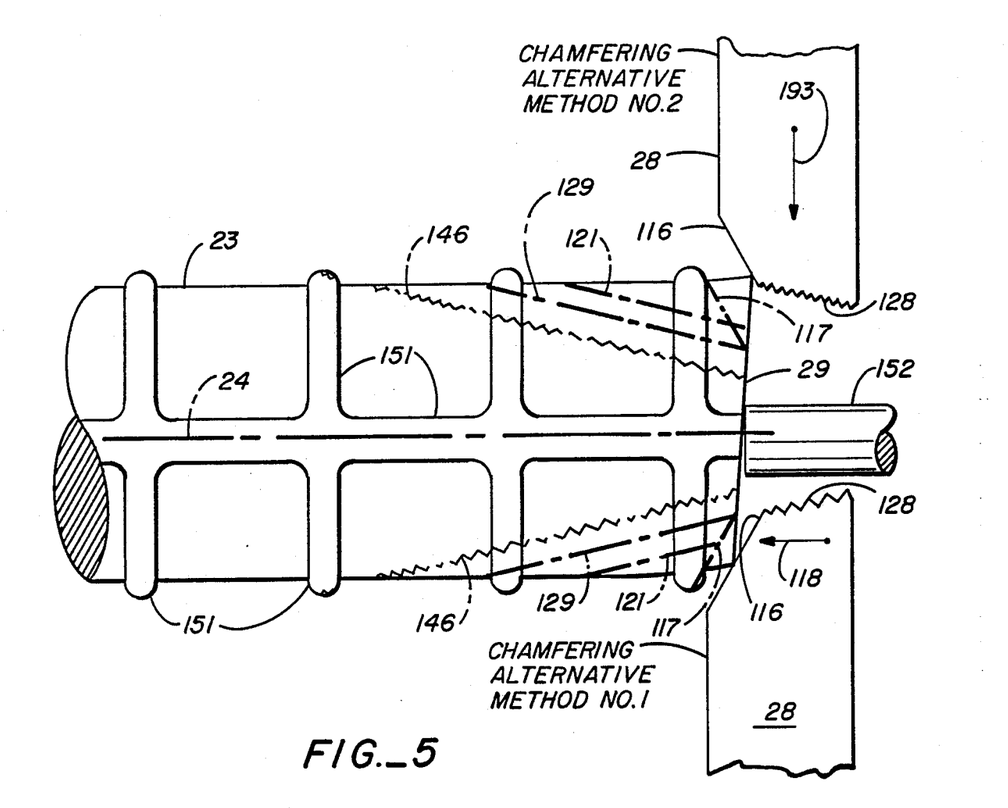
FIG. 5 is an enlarged, side elevation view of a reinforcing bar end as cut using the apparatus of the present invention.

Chamfering Alternative Method No. 2 is accomplished by positioning tools 28 substantially as shown for the top chaser in FIG. 5, i.e., radially outward of bar end 29 but axially overlapped with the bar end. Instead of moving housing 82 and housing 47 as a unit, only housing 47 would be displaced. Thus, housing 47 would be displaced toward the bar end while maintaining tools 28 in the same axial position. This could be accomplished with cylinder 112 and piston 113, for example. As housing 47 is moved toward the bar end and arms 33 are maintained in the same axial location, tools 28 will radially contract from the solid line position as indicated by arrow 193 in FIG. 5 to the phantom line position which will chamfer bar end 29 if there is sufficient axial overlap. (As shown in FIG. 5, tools 28 only slightly overlap bar end 29, but it will be understood that the degree of axial overlap can be readily selected to produce a chamfer at surface 117.)

A significant advantage of this second alternative chamfering process is that housing 82 containing the fluid control assembly 120 can be fixedly mounted to bed 31. This mounting eliminates the need for ways for housing 82 and the opposed piston-cylinder assemblies 101-103 and 107-108.

H. Operation-Thread Cutting

Referring again to FIG. 3B, when housing 82 reaches the "CHAMFER AND CUT" position, it will also trigger a limit switch 119 that starts the thread cutting cycle. Housing 47 will be at the "THIRD CUT" position, and piston 108 will be fully extended with cylinder 107 pressurized at the end of the chamfering operation. The entire thread cutting process is preferably carried out with housing 82 at the "CHAMFER AND CUT" position, and housing 82 is not returned to the "START" position until the end of threading cycle.

Once chamfer 117 is complete, the logic circuit can be used to set the cutting head assembly up for the first cut. FIG. 5 illustrates a large rebar, for example, a No. 18 rebar in which there are three cuts. The first cut is shown by the phantom line 121, and in order to make cut 121 with the thread chasers, the head and tool holders should be positioned in a position whichwill cause thread chasers 28 to be displaced along the frusto-conical surface 121.

Figure 6:
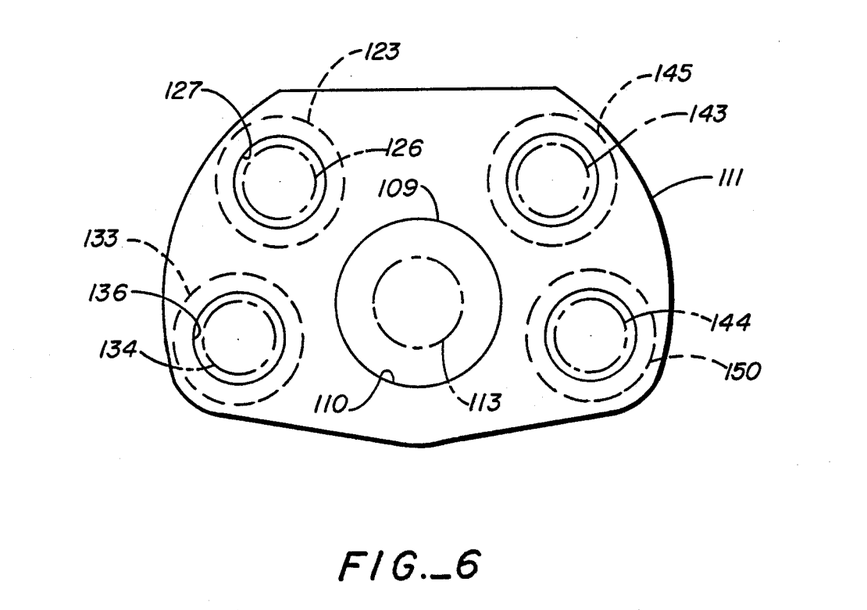
FIG. 6 is an enlarged, end elevation view taken substantially along the plane of line 6—6 in FIG. 3B.

Cylinder assembly 120 and stop assembly 115 are used to position housing 47 with drum 41 relative to tool holders 33 for the various threading cuts. For the first cut, cylinder 122 is pressurized to drive piston 123 to the right against collar 111. Collar 111 continues to move to the right until threaded stop rod 126 penetrates through over-sized opening 127 and engages piston 123. In FIG. 6, the stop rods are shown in phantom and the pistons, such as piston 123, are shown in dotted lines to have a diameter greater than the bores, such as bore 127, through collar 111.

Accordingly, the first cut thread is formed with housing 47 positioned at the "FIRST CUT" position, and lead control shoes 78 are moved by cylinders 79 from the phantom to the solid line position so as to engage the thread on spool 73. As the head is rotated by motor 46, the lead on spool 73 will positively control the advancement of the chasers along surface 121 (FIG. 5). Threaded spool 73 and support arm 84 will be driven by the shoes to the left, as indicated by arrows 83 and 131 in FIG. 2B. This in turn produces telescoping of piston 88 into cylinder 86.

As thread chasers 28 reach the end of the first cut, and preferably at the end of each of the cuts, it would be possible to simply continue to advance the thread chasers along the plane of surface 121 by maintaining shoes 78 in engagement with the threads on spool 73 until the chasers clear the bar. In order to enhance and speed this clearing action, however, it is a further feature of the present invention that housing 47 is displaced to the right, namely to the "RELEASE" position, so as to respread the tool holders and chasers at a rate which is faster than occurs merely by advancing push rod 62.

Spreading of the tools at the end of the cut can be accomplished by pressurizing cylinder 132 in cylinder assembly 120 so that piston 133 advances collar 111 to the right of the position at which collar 111 was stopped when piston 123 engaged stop 126. Thus, piston 133 moves collar 111 further in the direction of arrow 124 until piston 133 meets adjustable stop member 134 which passes through opening 136 in the collar. Such displacement moves housing 47 through connecting rod 109 to the position designated in FIGS. 2A and 3A as the "RELEASE" position. Actuation of cylinder 133 to start movement of housing 47 rearwardly occurs when the upper end 87 of bearing support arm 84 hits limit switch 137 mounted on support arm 140. Threading continues and shoes 78 engage spool 73 until the upper end 87 of support arm 84 hits a second limit switch 138.

Once the second limit switch 138 is encountered, the control circuit depressurizes cylinder 79 so that shoes 78 can return to an open position under the influence of biasing means 75. At this point, arm 84 is close to frame member 81 (FIG. 3B), and cylinder 86 may be pressurized to move arm 84 and spool 73 from the position of FIG. 3B back to the position of FIG. 2B, as indicated by arrow 139 in FIG. 3B. Movement of arm 84 to the right is limited by a shock absorber cylinder 141 having piston 142 which engages the arm and terminates its rightward displacement.

In order to effect the second cut, housing 47 is moved to the left from the "RELEASE" position to the "SECOND CUT" position. This can be accomplished by relieving cylinders 122 and 132 so that constantly pressurized cylinder 112 can displace piston 113 and collar 111 to the left until making contact with piston 145 (FIG. 6). A second cut cylinder mounted behind and aligned with cylinder 122 is pressurized to push piston 145 (FIG. 6) and the collar 111 to the right against a stop 143. Stop 143 engages piston 145 of the second cut cylinder through collar 111 and stops displacement of the collar toward the right when housing 47 reaches the "SECOND CUT" position shown in FIGS. 2A and 3A. At this point, the logic control circuit again engages shoes 78 with threaded spool 73 and a second cut 129 (shown in phantom in FIG. 5) is formed on the bar end.

When the end of the second cut is reached, piston 132 displaces collar 111 against stop 134 while the shoes are left engaged to release the thread chasers rapidly from the bar. Once the chasers are released, cylinder 86 is pressurized to return arm 84 to shock absorber piston 142, and a piston 113 of constantly pressurized cylinder 112 displaces collar 111 to the left. Thereafter, a third cut cylinder (located behind cylinder 132) displaces collar 111 to the right out against a stop 144, which causes housing 47 to be positioned in the "THIRD CUT" position.

After positioning for the third cut, shoes 78 are again engaged with spool 73 and the third cut, and in this case final cut, 146 is formed on bar end 29. At the end of the third cut housing 47 is again retracted to separate the thread chasers from the bar while th shoes remain engaged until limit switch 138 is encountered, usually about one-quarter to three-quarters of an inch of travel. At this point, the cylinder 101 is pressurized to return housing 82 to the "START" position, and pressurized cylinder 112 moves housing 47 to the left, followed by pressurization of the cylinder 132, which moves collar 111 to the right until housing 47 has reached the "RELEASE" position. The shoes are retracted and cylinder 86 displaces threaded spool 73 to the position of FIG. 2B, and the cycle is ready to be repeated for a new bar.

As will be appreciated, various fluid control circuits can be employed with combinations of movement of housing 47 and push rod 62 to get the desired positioning of chasers 28. The details of the combination of the fluid logic circuitry and electrical limit switch controls have not been set out since such fluid logic circuitry and electrical controls are well known to those skilled in the art and do not form a part of the present invention.

It should be noted that one advantage of a constantly pressured system is that if a loss of electrical power to the control circuit should occur, the hydraulic system would remain pressurized, thereby opening the tools through assembly 120 which is safer than a system which locks the tools in engagement with the bar.

I. Clamping Assembly

It is a significant feature of the present invention to provide clamping means 22 as a pair of vises 147 and 148 rigidly mounted to base 31 and formed with movable jaws 149 which can be clamped, usually hydraulically, against bar 23. Such vises are well known in the industry and are sold, for example, by Teledyne Landis Corporation. The use of a rigid clamping assembly 22 on bed 31 insures that the central longitudinal axis 24 of the rebar will not shift with respect to the rotational axis 26 of the cutting head during thread cutting. Prior art pipe threading machines have clamping jaws which can float and are, therefore, characterized as being "self-aligning." The use of a self-aligning clamping structure, however, is not desirable since preferential engagement of a rib 151 on the bar (even after chamfering) can cause displacement of the bar within the self-aligning vise, with the result that the thread is formed on the bar at an angle or about an axis displaced from the central longitudinal axis 24. Even with a rigid bar clamping assembly, it will be appreciated that the ribs can affect the positioning of axis 24 with respect to rotational axis 26, but the use of two spaced apart vises 147 and 148 tends to minimize lateral displacement and angular skewing, and at least maintain such deviations in a constant relationship throughout the cut. When this rigid clamping is used together with a positive lead control structure, the resultant thread on the bar end is more reproducible and has better angular alignment on the average than would otherwise be the case.

J. Bar Placement

Positioning of bar end 29 at the correct axial spaced relationship from cutting head assembly 27 is preferably accomplished by stop means 152 (FIG. 5). Stop means 152 can be provided by a number of different techniques. Thus, it is possible to mount stop means 152 to pivot from bed 31 or vise 148 into the position shown in FIG. 5. Alternatively, stop 152 can be manually positioned in front of the face 34 of the rotating drum 41. It is also possible to provide a central bore along axis 26 with a connecting rod extending along axis 26 and out through end 71 of push rod 62 to a position allowing hydraulic projection and retraction of the stop.

K. Tool Mounts

Thread chasers 28 can be mounted to the tool holder arms 33 by a variety of thread chaser mounting structures. As shown in most of the drawings, the thread chasers are schematically represented, but in FIG. 4 a more accurate representation of the assembly for mounting thread chasers 28 to tool holder arms 33 is illustrated. As will be seen, thread chasers 28 are clamped to a generally triangular member 153, which in turn is bolted by fastener 154 to arm 33. Mounted against longitudinally extending surface 156 is chaser 28, which is clamped in place by clamping means 157. A threaded screw member 158 can be used to adjust the axial position of chaser 28 along support surface 156 so that teeth 128 of the chaser are in the desired position, namely, a position which is substantially tangential to the surface being cut on bar 23. This structure allows the thread chaser to be removed from the mounting member 153 and sharpened by means of a grinder. The chaser can then be returned and clamped to the chaser holder and threaded member 158 and clamp 157 used to reset the chaser at the proper position for tangential engagement of the bar. Rotation between arm member 33 and chaser holder 153 is resisted by bolt 154 and a transversely extending channel in both the end of arm 33 and chaser mount 153. A locking key 159 extends between the channels to prevent relative rotation. As will be apparent, such rotation also can be resisted by a second or third bolt in addition to bolt 154.

L. Changes to Accommodate Various Bar Diameters

As will be appreciated, bars of different diameter will require positioning of chasers 28 at different positions with respect to tool holding arms 33. Thread chaser holders 153 are repositioned on tool holding arms 33 by providing an elongated slot 161 for bolt 154 and mounting a spacer key 162 between flat surface 163 in the end of arm 33 and a keyway 164 mounted to chaser holder 153. A fastener 166 secures spacer key 162 in keyway 164 and the width of spacer key 162 bearing against surface 163 determines the position along slot 161 that bolt 154 clamps the chaser holder 153 to the arm end 33. This position, in turn, determines the radial location of the chaser with respect to axis 26.

In addition to shifting chaser holder 153 to correctly position chasers 28 when bars of different diameter are threaded, other changes in the apparatus of the present invention are preferably made. The chasers themselves are normally changed to accommodate the different thread leads. Spool 73 and shoes 78 also are changed to match the chaser lead. Additionally, stop 152 may be varied in length in accordance with the bar size, and the speed reduction of drive assembly 171 varied with the power requirements for each bar. Normally such changes are not required for bars of similar sizes, and some variations are optional for optimal performance. Additionally, as above noted, stop assembly 115 can be used to reprogram the positioning of the tools to accommodate various performance objectives and/or bar size changes.

M. Cost Savings

Using the apparatus and method of the present invention, considerable cost savings can be realized as compared to taper threading rebar ends by means of either a pipe threading-type of machine or a thread milling-type of operation. The cost of threading including machine cost, cutter cost and labor cost for the thread milling machine varies between $2.75 for a No. 8 reinforcing bar end to $5.60 for a No. 18 reinforcing bar end. For a pipe threading-type of machine the cost ranges from about $1.75 per threaded end for a No. 8 bar to about $7.00 a threaded end for a No. 18 bar. The apparatus of the present invention reduces the cost per threaded end to about $1.00 per threaded end for a No. 8 bar and to about $3.00 per threaded end for a No. 18 bar. These cost reductions result from lower tooling costs, faster threading time and accordingly a reduction in labor cost, and the need for fewer repairs, less frequent chaser sharpening and less machine maintenance.

Using the apparatus of the present invention, No. 7 to No. 11 bars can be taper threaded with two passes or cuts, No. 14 and 18 bars are most preferably threaded with three passes or cuts. For nuclear applications a No. 18 bar having a long thread is preferably cut with four passes. The control logic circuitry, therefore, preferably provides all these options, together with the chamfering option.

What is claimed is:

1. A thread cutting apparatus for forming a tapered thread on a bar end of an elongated reinforcing bar having a longitudinal axis, said apparatus including bar clamping means formed to releasably hold said bar for formation of said thread on said bar end; a cutting head assembly mounted proximate said clamping means for rotation about a rotational axis substantially aligned with said longitudinal axis, said head assembly including tool holder means and thread cutting tool means mounted to said tool holder means for rotation with said head assembly, and drive means coupled to said head assembly for advancemnt of said tool holder means and for simultaneous rotation of said head assembly to cause said tool means to engage and cut a thread on said bar end at an angle to said longitudinal axis; wherein the improvement in said thread cutting apparatus comprises:

said head assembly is mounted proximate said bar end in axially spaced relation thereto and includes a face portion facing said bar end, and guide means extending at said angle in said head assembly away from said face portion;

said tool holder means being movably mounted in said guide means and cantilevered outwardly at said angle from said face portion toward said bar end;

said face portion and said tool holder means being cooperatively formed to prevent metal chips from penetrating between said face portion and said guide means during cutting of said bar end;

said thread cutting apparatus further being formed to prevent metal chips from migrating around said head assembly to said guide means; and said guide means guiding cantilevered displacement of said tool holder means away from said face portion along said longitudinal axis at said angle thereto to effect cutting of said thread.

2. The thread cutting apparatus as defined in claim 1 wherein, said tool holder means is formed for free passage of metal chips generated during cutting away from said tool holder means.

3. The thread cutting apparatus as defined in claim 1 wherein, said cutting apparatus includes a stationary housing substantially enclosing said guide means and having a side facing said bar, said face portion is substantially flush with and mounted for rotation in substantially sealed relation to said side of said housing, and said tool holder means is mounted in substantially sealed sliding relationship to said face portion for displacement toward said bar at said angle to said longitudinal axis in a direction away from said face portion and said side of said housing.

4. The thread cutting apparatus as defined in claim 1 wherein, said tool holder means is provided as a plurality of arms each mounted for displacemnt away from said face portion at said angle, and said tool means is provided by a plurality of thread chasers mounted proximate the ends of each of said arms.

5. The thread cutting apparatus as defined in claim 1 wherein, said tool holder means is provided by elongated arms each mounted to elongated guide means in said head assembly with the longitudinal axes of said arms aligned at said angle with respect to the longitudinal axis of said bar for displacement of the ends of said arms outwardly from said barrier means along said angle.

6. The thread cutting apparatus as defined in claim 1 wherein, said tool holder means is coupled to lead control assembly for controlled displacement of said tool holder means away from said face portion to establish and control the cutting of a lead of said thread.

7. The thread cutting apparatus as defined in claim 1 wherein, said tool holder means includes a plurality of axially displaceable arms mounted for sliding displacement through said face portion at said angle, and a lead control assembly coupled to control the advancement of said arms during cutting of said thread.

8. The thread cutting apparatus as defined in claim 7 wherein, said arms are coupled to a common cage assembly formed for axial displacement of said arms as a unit, and said cage assembly and lead, control, assembly are mounted on said remote side of said face portion and said cage assembly is coupled to said lead control assembly.

9. The thread cutting apparatus as defined in claim 1 wherein, said guide means includes a rotatable drum having a plurality of axially extending bores therein positioned radially outwardly of said rotational axis and inclined thereto at said angle, said tool holder means is provided by a plurality of arms mounted for sliding axial displacement in said bores, and a lead control assembly coupled to said arms and formed for controlled advance of said arms outwardly of said bores.

10. The thread cutting apparatus as defined in claim 9 wherein, said lead control assembly includes threaded spool coupled for rotation with said drum, a threaded shoe assembly formed for selective mating engagement with and disengagement from said threaded spool and mounted for axial displacement along said threaded spool upon engagement therewith and rotation of said drum, linkage means coupling said shoe assembly to said arms for displacement of said arms relative to said drum at a rate determined by the displacement of said shoe assembly due to the lead on said threaded spool.

11. The thread cutting assembly as defined in claim 10 wherein, said linkage means includes a push rod telescopically mounted with respect to said threaded spool and coupled to said shoe assembly.

12. The thread cutting assembly as defined in claim 10, displacement means formed to displace said shoe assembly and said arms to a start position after axial displacement thereof upon engagement of said threaded spool by said shoe assembly, and control means coupled to actuate engagement and disengagement of said shoe assembly with said threaded spool, and coupled to said displacement means to return said shoe assembly to said star position.

13. The thread cutting apparatus as defined in claim 1 wherein,
   said head assembly and tool holder means are mounted in a housing, said housing means being supported for axial displacement thereof toward said bar during rotation of said head assembly until said tool means engages said bar end,
   said tool means includes a cutting edge disposed and oriented to chamfer said bar end upon axial displacement of said housing and engagement of said cutting edge with said bar end, and
   control means coupled for selective axial displacement of said housing and axial displacement of said tool holder means relative to said housing.

14. The thread cutting apparatus as defined in claim 1, and
   control means coupled for displacement of said tool holder means toward and away from said bar and coupled for displacement of said head assembly with respect to said tool holder means while maintaining said tool holder means stationary with respect to said bar to enable variation of the radius from said longitudinal axis at which said tool means first engages said bar.

15. The thread cutting apparatus as defined in claim 14 wherein,
   said control means includes a plurality of pistoncylinder assemblies and opposed stop means formed for selective control of the axial displacement of said head assembly relatively to said tool holder means in a direction toward and away from said bar.

16. A thread cutting apparatus for forming a tapered thread on a bar end of an elongated bar having a longitudinal axis, said apparatus including bar clamping means formed to releasably hold said bar for formation of said thread on said bar end, a cutting head assembly mounted proximate said clamping means for rotation about a rotational axis substantially aligned with said longitudinal axis, said head assembly including tool holder means mounted for displacemnt in a direction along said rotational axis during rotation of said head assembly, thread cutting tool means mounted to said tool holder means, and drive means coupled to said head assembly for displacement of said tool holder means and for simultaneous rotation of said head assembly to cause said tool means to engage and cut a thread on said bar end at an angle to said rotational axis, wherein the improvement in said thread cutting apparatus comprises:
   said head assembly is mounted proximate said bar end in axially spaced and aligned relation thereto, and said head assembly includes a face portion facing said bar end;
   said tool holder means being cantilevered outwardly at said angle from said face portion of said head assembly toward said bar end; and
   said head assembly guiding cantilevered displacement of said holder means away from said face portion along said rotational axis at said angle thereto to effect cutting of said thread.

* * * * *